United States Patent [19]

Viscolosi

[11] 4,377,884
[45] Mar. 29, 1983

[54] APPARATUS FOR DEBONING POULTRY LEGS

[76] Inventor: Louis A. Viscolosi, Five Pasco Dr., Johnston, R.I. 02919

[21] Appl. No.: 287,997

[22] Filed: Jul. 29, 1981

[51] Int. Cl.³ .............................................. A22C 21/00
[52] U.S. Cl. ........................................ 17/11; 17/1 G; 17/46
[58] Field of Search .............................. 17/11, 46, 1 G

[56]  References Cited
U.S. PATENT DOCUMENTS 3,348,261 10/1967 Segur ................................... 17/11 X
3,629,903 12/1971 Turner ..................................... 17/11
3,665,553 5/1972 Colosky ................................... 17/11
3,672,000 6/1972 Martin et al. ............................ 17/11
4,327,463 5/1982 Martin ............................... 17/1 G X Primary Examiner—Willie G. Abercrombie
Attorney, Agent, or Firm—Barlow & Barlow, Ltd.

[57] ABSTRACT

A poultry leg deboning machine is disclosed that has a plurality of stripping trays that receive and engage the enlarged end portion of a thigh bone with a pusher plate engaging the opposite end of the bone and forcing the bone through stripping jaws, all of the trays being located on a continuous moving belt-like structure, the severed meat being dropped off at the end of the structure from each of the operating trays.

2 Claims, 5 Drawing Figures

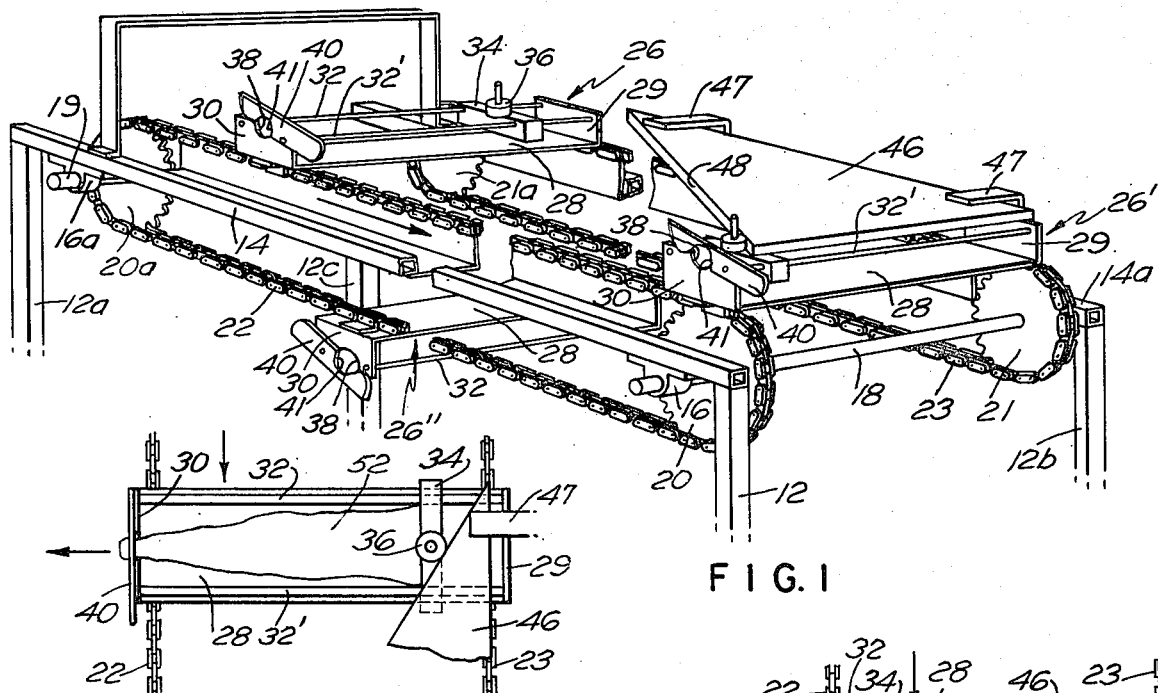
FIG. 1
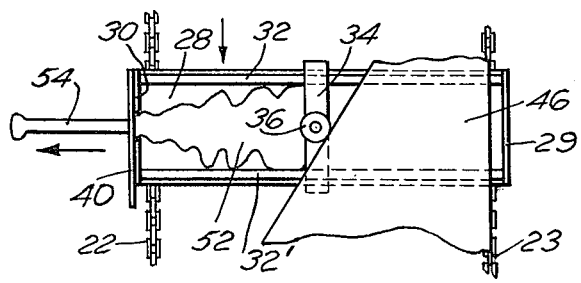
FIG. 2
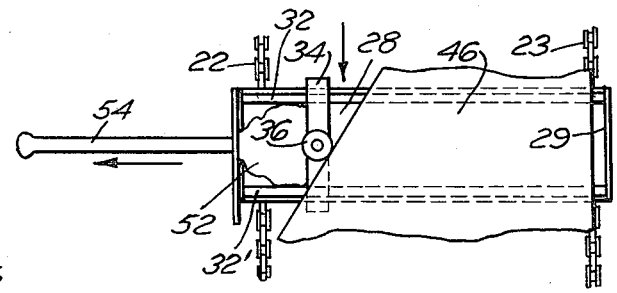
FIG. 4
FIG. 3
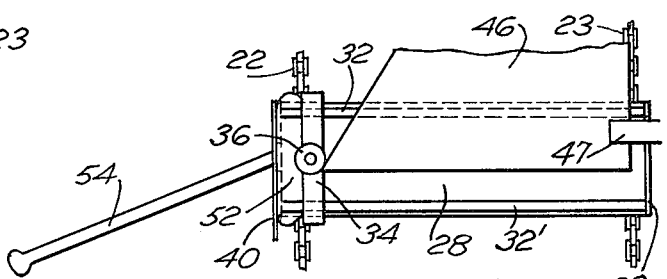
FIG. 5

APPARATUS FOR DEBONING POULTRY LEGS

BACKGROUND OF THE INVENTION

The instant invention relates to a machine that automatically strips meat from bones of fowl, such as thigh bones, the bones being particularly characterized as having a singular section with a nub at either end thereof. It has been conventional to strip meat from bone structures of fowl by hand. There have been developed some mechanical means for removing meat such as disclosed in the Segur patent, U.S. Pat. No. 3,233,282, which discloses jaws for removing meat from poultry wings, but this is a fixed structure that requires manual removal of the meat. Similarly in the Segur patent, U.S. Pat. No. 3,510,908 there is shown another static fixture which is employed to remove meat from components such as leg bones and leg tendons. The instant invention provides an automatic deboning apparatus which avoids the utilization of manual stripping of the meat from the apparatus. After having once placed the meat and bone in the apparatus the remaining operations are completely automated.

SUMMARY OF THE INVENTION

The present invention provides an automatic deboning apparatus having a plurality of operational heads or trays which accept thigh bones and remove the raw meat therefrom, each of the trays having a stripping knife or jaw located at one end thereof with a tray for receiving the meat and a pusher bar at the far end thereof that would engage the enlarged end of the bone. A camming device engages the pusher bar as the trays move along a conveyor belt means and slowly push the thigh bones through the stripping knife, eventually forcing the bone out through the stripping knife to be deposited while the meat is dropped off the end of the conveyor into a separate container.

It is therefore a principal object of the instant invention to provide a high speed automatic deboning machine, particularly designed for thigh bones of poultry which consolidates the functions of previously known non-automatic devices.

BRIEF DESCRIPTION OF THE DRAWINGS

FIG. 1 is a perspective detached view of a machine made in accordance with the invention;

FIGS. 2, 3, 4 and 5 illustrate in simplified top plan view form the operational tray as it moves from the first loaded position to the final position.

DESCRIPTION OF THE PREFERRED EMBODIMENT

Referring to FIG. 1 the deboning apparatus has a support frame 10 that consists generally of upright legs 12, 12a, 12b and 12c to which a longitudinal member 14, 14a are attached. Journals 16, 16a and corresponding journals not shown on the support member 14a, mount for rotation shafts 18, 19 which have fixed thereto sprocket wheels 20, 20a and 21, 21a. Sprocket wheels 20 and 20a and 21, 21a have stretched therebetween a roller chain 22, 23 respectively and a motor (not shown) is coupled to the shaft 19 to power the roller chains 22, 23. Essentially the roller chains 22, 23 form a conveyor and between the roller chains there is mounted a plurality of trays 26, 26', 26" for example, being shown only three trays, although it is to be understood that depending upon the length of the conveyor, any number of trays can be fixed thereto.

The trays 26 which are affixed to the chains 22 and 23 are comprised of a bottom wall 28 with two end walls 29 and 30, tray 26 being described since it is identical to all of the other trays. Extending between the end walls 29 and 30 are a pair of rods 32, 32' and on these rods there is mounted a traverse bar 34 which has an upstanding pin 36 rising therefrom with sufficient depth of the bar being had so that the same may readily engage a bone as will presently be described. The end wall 30 is defined by an arcuate recess 38 and pivotally mounted in relation to the end wall 30 is a cooperating jaw member 40 also provided with an arcuate recess 41. The recesses 38 and 41 are sharpened in a fashion so that the beveled edges thereof are on outside planal faces, much of the structure being similar to scissors where the juxtaposed planal faces are flat and effectively present a sharp edge when considered with the beveled opposite faces.

At the end of the machine opposite the receiving end which is to the right as viewed in FIG. 1, there is located over the tray area a cam plate 46 which is supported onto the longitudinal frame 14a by brackets such as 47, 47' and has an edge 48 that extends at an acute angle to the longitudinal extent of the conveyor. The arrangement is such that as each of the trays moves toward the camming plate 46, the pins 36 will engage the edge 48 forcing the pusher bar 34 toward the end wall 30 of the tray.

Referring now to FIGS. 2, 3, 4 and 5, the operation of the apparatus will become readily apparent. In FIG. 2 the poultry thigh 52 has been loaded into the tray so that one nub end of the bone 54 extends out through the jaws formed by the arcuate recesses 38 and 41, and as the pin 36 engages the edge 48 of the cam plate 46 the bone will be slowly pushed to the left as seen in FIG. 3 and even further as seen in FIG. 4 to the point where the pusher bar 34 will eventually eject the bone as seen in FIG. 5 while the meat will be left in the tray and after the cam plate has been disengaged as the tray falls over the end of the conveyor and turns around the sprockets 20 and 21, the meat will fall off the right hand end as seen in FIG. 1 of the apparatus into a receiving tray.

I claim:

1. An apparatus for automatically deboning poultry sections comprising a support frame, a conveyor means on said support frame, said conveyor means including a spaced pair of roller chains, a plurality of trays supported on said spaced roller chains so as to extend therebetween, each tray having a stripper jaw at one end thereof and a follower block supported for longitudinal movement on each of said trays, said follower block carrying a vertically extending pin, a cam plate located at the delivery end of said conveyor whereby as each of the trays moves along the conveyor said pin will engage the cam plate and move the follower block toward the stripping jaw.

2. An apparatus for automatically deboning poultry sections as in claim 1, wherein each tray has spaced rods extending therealong, said follower block engaging said rods for guided movement.

* * * * *